Patented Feb. 21, 1933

1,898,457

UNITED STATES PATENT OFFICE

FRIEDRICH MUTH, OF ELBERFELD, GERMANY, ASSIGNOR TO GENERAL ANILINE WORKS, INC., OF NEW YORK, N. Y., A CORPORATION OF DELAWARE

INDOPHENOL SULPHUR DYESTUFFS

No Drawing. Application filed January 6, 1930, Serial No. 418,998, and in Germany January 11, 1929.

The present invention relates to new sulphur dyestuffs and more particularly to sulphur dyestuffs obtainable by subjecting an indophenol or leuco indophenol obtained from an alkyl- or aralkyl-1-naphthylamine-6- or 7-sulfonic acid and a para-amino phenol or a substitution product thereof to sulphur fusion while applying an aqueous or alcoholic solution of alkali metal polysulphides to which reaction mass copper or a salt thereof may be added.

The starting materials for the new sulphur dyestuffs have the following general formula:

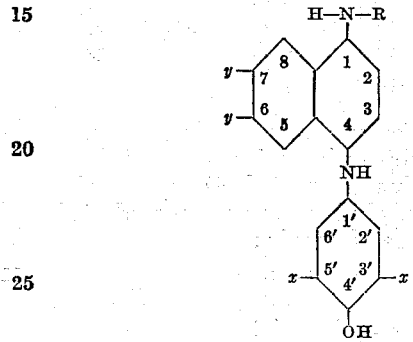

wherein one $y$ stands for a sulphonic acid group and the other $y$ stands for hydrogen, R stands for alkyl or aralkyl and $x$ for hydrogen or chlorine.

For the purpose of the preparation of sulphur dyestuffs from these compounds it is immaterial whether the compound is present in the indophenolic form or as leuco indophenol. The leuco indophenol is obtainable from the indophenol by reduction with sodium sulphide, hydrosulphite or bisulphite.

The new dyestuffs form greyish to dark blue powders with a copper lustre, being easily soluble in aqueous sodium sulphide solutions with bluish green colorations. They dissolve in concentrated sulphuric acid with blue colorations. The new sulphur dyestuffs dye cotton from a sodium sulphide bath green shades of good fastness properties to washing and boiling.

The following examples illustrate my invention without being limited thereto:

*Example 1.*—51.9 parts by weight of the leuco indophenol 4-(1-ethylamino-6-sulpho)-naphthyl-1'-(4' hydroxy-phenyl-) amine of the formula,

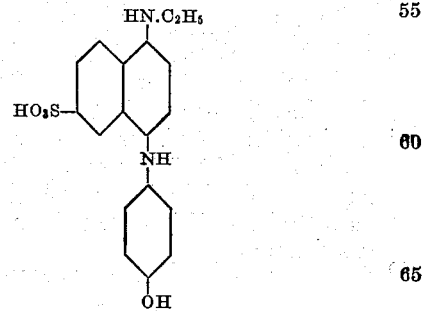

obtained from ethylnaphthylamino-6-sulphonic acid and p-aminophenol, are introduced into an aqueous polysulphide solution of 154 parts by weight of crystallized sodium sulphide and 62 parts by weight of sulphur. After the addition of 15 parts by weight of crystallized copper sulphate, water is distilled off until the internal temperature reaches 103° C. The liquid is then boiled for 20–24 hours under a reflux condenser and the dyestuff is precipitated from the finished melt by blowing air therethrough, it is filtered off, washed and dried. The dyestuff is a black powder, which dissolves readily in dilute sodium sulphide with a bluish green coloration. It is soluble in concentrated sulphuric acid with a blue coloration, which on the addition of water changes to violet. It dyes cotton a pure green. The fastness to washing and boiling is satisfactory. The solubility is likewise satisfactory.

When the melting is carried out without the addition of copper a more bluish dyestuff is obtained.

*Example 2.*—51.9 parts by weight of the leuco indophenol 4-(1-ethylamino-7-sulpho-) - naphthyl - 1' - (4' - hydroxyphenyl) - amine of the formula,

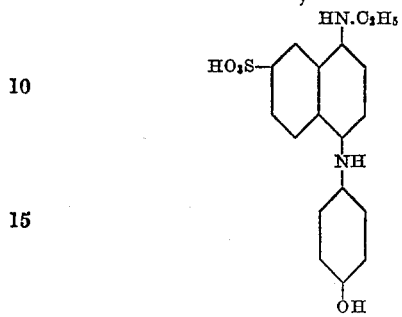

obtained from ethyl-α-naphthylamino-7-sulphonic acid and p-aminophenol, are melted and worked up as described in Example 1.

The dyestuff obtained displays the same properties.

*Example 3.*—51.9 parts by weight of the mixture of the leuco indophenols (formula given in Examples 1 and 2), obtained from the mixture of ethyl-1-naphthylamine-6-sulphonic acid and ethyl-1-naphthylamine-7-sulphonic acid (obtainable by ethylating the technical mixture of Cleve acids) and p-aminophenol, are melted and worked up as described in Example 1.

The dyestuff displays the same properties.

*Example 4.*—60.8 parts by weight of the leuco indophenol 4-(1-benzyl-6-sulpho-) naphthyl-1'-(4'-hydroxyphenyl-)-amine of the formula,

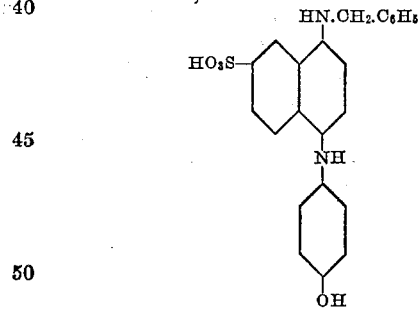

obtained from benzyl-1-naphthylamine-6-sulphonic acid and p-aminophenol, are boiled for some 60 hours under a reflux condenser with 250 parts by volume of an alcoholic polysulphide solution, containing 50 parts by weight of 100% sodium sulphide and 64 parts by weight of sulphur. After displacing the alcohol by water, the dyestuff produced is isolated in the known manner, for example by blowing air in.

*Example 5.*—24.8 parts by weight of the leuco indophenol 4-(1 - ethylamino - 6 - sul - pho-)-naphthyl-1'-(4'-hydroxy-3.5-dichlorophenyl)-amine of the formula,

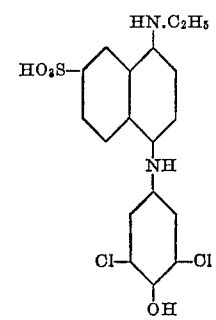

obtained from ethyl-α-naphthylamine-6-sulphonic acid and 1-amino-3.5-dichloro-4-hydroxy benzene, are introduced into an aqueous polysulphide solution, containing 67.6 parts by weight of crystallized sodium sulphide and 24.8 parts by weight of sulphur. After the addition of 5 parts by weight of crystallized copper sulphate boiling takes place at an internal temperature of 105–106° C. under a reflux condenser for about 20 hours until the formation of the dyestuff is complete. After dilution with water the dyestuff is precipitated from the finished melt by passing air through the solution. It is filtered, washed and dried.

The dyestuff is thus obtained as a black powder, which dissolves readily in dilute sodium sulphide with a bluish green coloration and dissolves in concentrated sulphuric acid with a blue coloration.

Cotton is dyed pure green shades. The fastness to washing and boiling is satisfactory, the solubility is likewise good.

I claim:

1. As new compounds sulphur dyestuffs which are subtsantially identical with the products obtainable by subjecting to an alkali metal polysulphide melt a compound of the probable general formula:

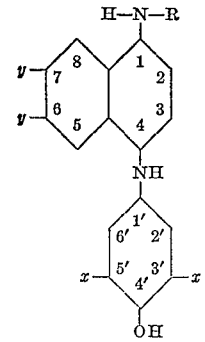

wherein one $y$ stands for a sulphonic acid group and the other $y$ stands for hydrogen, R stands for alkyl or aralkyl and $x$ stands for hydrogen or chlorine, said products being greyish to dark blue powders having a copper lustre, dissolving easily in aqueous sodium sulphide solutions with bluish green colorations, dissolving in concentrated sulphuric acid with blue colorations and dyeing cotton from a sodium sulphide bath green shades of good fastness properties to washing and boiling.

2. As new compounds sulphur dyestuffs which are substantially identical with the products obtainable by subjecting to an alkali metal polysulphide melt a compound of the probable general formula:

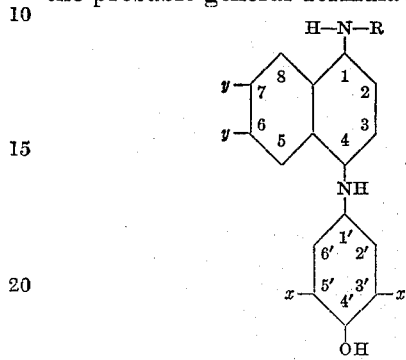

wherein one $y$ stands for a sulphonic acid group and the other $y$ stands for hydrogen, R stands for alkyl and $x$ stands for hydrogen or chlorine, said products being greyish to dark blue powders having a copper lustre, dissolving easily in aqueous sodium sulphide solutions with bluish green colorations, dissolving in concentrated sulphuric acid with blue colorations and dyeing cotton from a sodium sulphide bath green shades of good fastness properties to washing and boiling.

3. As a new product a sulphur dyestuff which is substantially identical with the product obtainable by subjecting to an alkali metal polysulphide melt a compound of the probable formula:

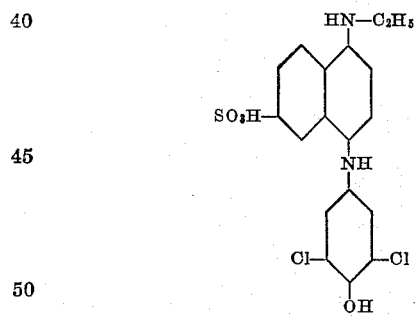

being a dark blue powder, dissolving readily in an aqueous sodium sulphide solution with a bluish green coloration, dissolving in concentrated sulphuric acid with a blue coloration and dyeing cotton pure green shades of good fastness properties to washing and boiling.

In testimony whereof, I affix my signature.

FRIEDRICH MUTH.